United States Patent [19]
Morikawa

[11] Patent Number: 6,041,165
[45] Date of Patent: Mar. 21, 2000

[54] IMAGE FORMING APPARATUS CAPABLE OF FORMING AN IMAGE AT A PLURALITY OF RESOLUTIONS

[75] Inventor: Takeshi Morikawa, Okazaki, Japan

[73] Assignee: Minolta Co., Ltd., Osaka, Japan

[21] Appl. No.: 08/941,523

[22] Filed: Sep. 30, 1997

[30] Foreign Application Priority Data

Mar. 12, 1997 [JP] Japan ..................................... 9-057686

[51] Int. Cl.[7] .................................................. G06K 15/00
[52] U.S. Cl. ............................................ 395/102; 395/102
[58] Field of Search .................................... 395/101, 102, 395/113, 112, 845, 822, 826, 888, 892, 834–836, 887–886; 358/447, 468, 444, 448, 451; 382/298, 299; 399/2, 370, 376

[56] References Cited

U.S. PATENT DOCUMENTS 5,021,892  6/1991  Kita et al. ............................... 358/468
5,025,325  6/1991  Hudson .................................... 358/447

FOREIGN PATENT DOCUMENTS 05208522  8/1993  Japan .
7-050738  2/1995  Japan .

Primary Examiner—Arthur G. Evans
Attorney, Agent, or Firm—Sidley & Austin

[57] ABSTRACT

In a user-friendly image forming apparatus which reduces operation errors by users, a job being read unregistered in a print waiting table and is added in the print waiting table when a print starting condition is satisfied, and printed at a resolution according to the data source of the job. When the print mode is the weekly magazine binding mode, the print starting condition is satisfied at the time when reading of all pages of image data is completed. When the print mode is the upward-facing mode, it is satisfied at the time when reading of one page of image data is completed.

10 Claims, 14 Drawing Sheets

IMAGE FORMING APPARATUS CAPABLE OF FORMING AN IMAGE AT A PLURALITY OF RESOLUTIONS

1. Field of the Invention

The present invention relates to an image forming apparatus capable of forming an image at a plurality of resolutions and particularly to an image forming apparatus which controls the timing at which resolutions are changed depending on various modes of operation.

2. Background of the Invention

A copying machine in which the resolution in printing is changed depending on the application includes an electrophotographic printer disclosed in Japanese Patent Laying-Open No. 5-208522. In the electrophotographic printer, resolution can be arbitrarily switched according to an indication from the host computer.

However, the prior art printer described above only switches resolutions according to the indication from the host computer and is not at all concerned about the control of resolution switching.

Meanwhile, there is a digital copying machine usable for a plurality of applications, such as the copy application for printing an image read by an image reader and the printer application for printing an image received from a connected, external device. While resolution is hopefully fixed independently of applications, the copying machine can be used at a different resolution for each application. Thus, simply changing a resolution in initiation of each application, as is in conventional printers, will allow the digital copying machine to switch the resolution while actual printing has not yet been started.

More specifically, let us assume, for example, that a digital copying machine provides printing in the printer application and then the copy application is initiated with the resolution for the printer application set at 600 dpi (dots/inch) and the operation of the copy application is started. For conventional digital copying machines, resolution is immediately switched to 400 dpi for the copy application. In the operation of the copy application, however, an original is read to read image data and then printing is performed based on the image data. Thus, at the time when a resolution is just switched, original reading has not been completed and image data has not been obtained.

With a digital copying machine with the multi-job function, image data can be received in the printer application while an original is being read in the copy application. Thus, if image data is received and printed in the printer application during original reading, the digital copying machine must again return the resolution to the 600 dpi for the printer application and then again to the resolution of 400 dpi for the copy application.

That is, since the resolution is switched to the 400 dpi for the copy application before printing is started in the copy application, resolution switching operation is frequently performed. Resolution switching is time-consuming and thus printing productivity as a whole can be significantly degraded.

SUMMARY OF THE INVENTION

The present invention is made to solve the aforementioned problems and contemplates a user-friendly image forming apparatus capable of reducing users' operation errors.

In order to achieve the aforementioned object, an image forming apparatus capable of forming an image depending on the print mode at a different printing resolution for each application according to an aspect of the present invention includes: a resolution switching control portion for controlling the switching of printing resolution in switching an application; and a portion for setting the timing of resolution switching for setting the timing of the printing-resolution switching for the resolution switching control portion depending on the print mode.

The image forming apparatus according to the present invention can switch between printing resolutions at the optimal switching timing without setting a printing resolution by a user, and thus form an image at the optimal printing resolution. This reduces users' operation errors and provides a user-friendly image forming apparatus.

According to another aspect of the present invention, an image forming apparatus capable of forming an image from image data obtained from an image data source according to a print mode at a different printing resolution for each image data source includes: a memory for storing the image data; a printer for reading the image data from the memory and forming an image according to the print mode at a printing resolution determined depending on the image data source of the image data; a resolution switching control portion for controlling the switching of a printing resolution of the printer; and a portion for setting the timing of the printing-resolution switching for the resolution switching control portion according to the print mode.

The image forming apparatus according to the present invention can switch a printing resolution depending on the image data source at the optimal switching timing without setting a printing resolution by a user, and thus form an image at the optimal printing resolution. This allows a user-friendly image forming apparatus capable of reducing users' operation errors.

According to still another aspect of the present invention, an image forming apparatus capable of forming an image from image data obtained from an image data source according to a print mode at a different printing resolution for each image data source includes: an image reader for reading image data of an original; an external receiving device for externally receiving image data; a memory for storing the image data; a print waiting table; a print job registering portion for registering the image data stored in the memory as a print job in the print waiting table when the image data stored in the memory reaches the number of pages determined depending on the print mode; a printer reading the image data included in the print job from the print waiting table for forming an image at a printing resolution determined depending on the image data source of the image data; a resolution switching control portion for controlling the switching of a printing resolution of the printer; a portion for setting the timing of the printing-resolution switching for the resolution switching control portion according to the print mode.

The image forming apparatus according to the present invention can switch a printing resolution depending on the image data source at the optimal switching timing without setting a printing resolution by a user, and thus form an image at the optimal printing resolution. Furthermore, image forming is started when the number of pages of image data required for image forming depending on the print mode is reached. This allows a user-friendly image forming apparatus capable of reducing users' operation errors.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
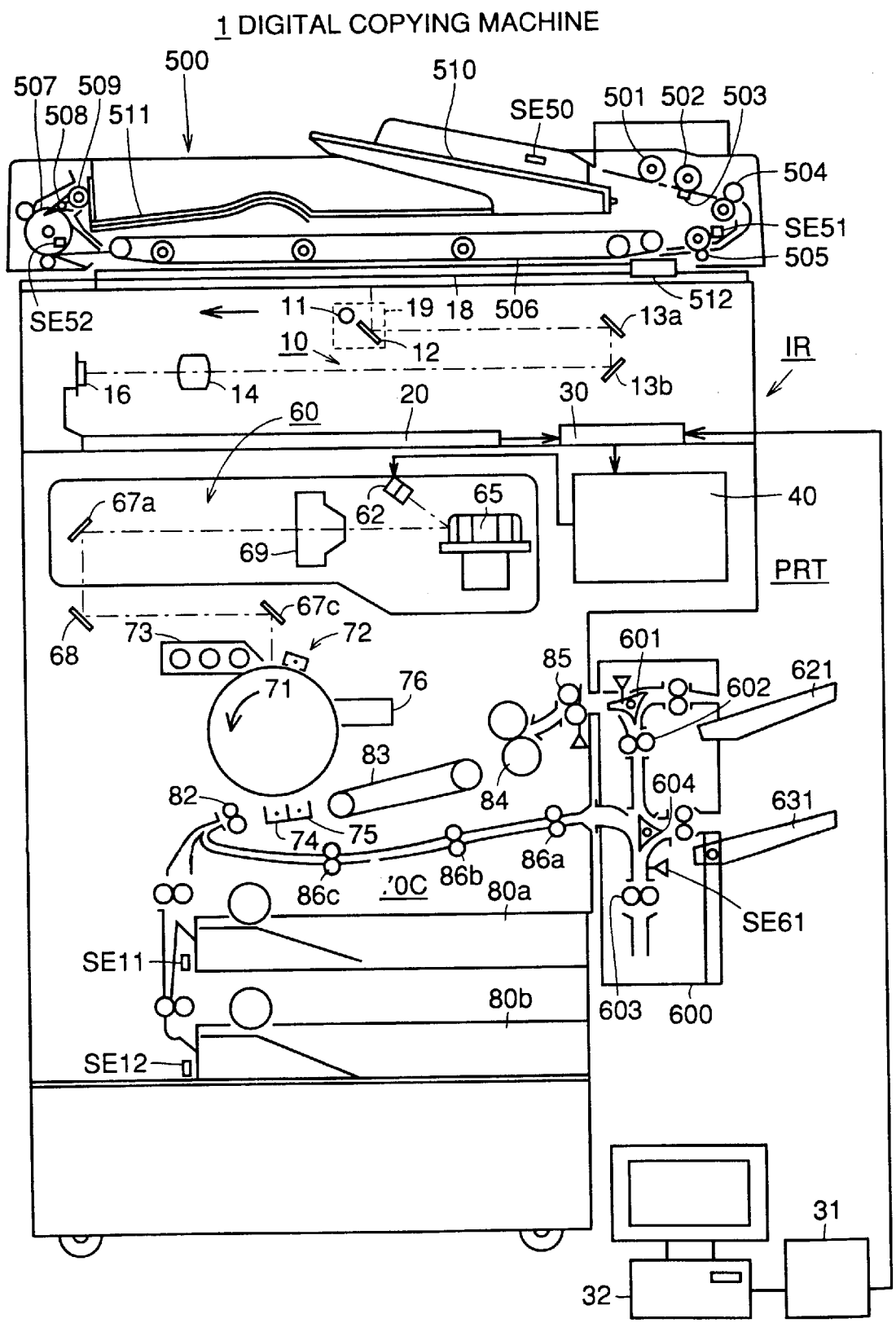
FIG. 1 is a front cross sectional view of an entire structure of a copying machine according to a first embodiment of the present invention.

Referring to FIG. 1, a digital copying machine as one example of the present invention includes an image reader IR and a printer PRT. Digital copying machine 1 is operable in the copy application in which image reader IR reads an image of an original and the read image of the original is printed by printer PRT. Furthermore, digital copying machine 1 is connected to an external extension unit 31 and thus also operable in the printer application in which digital copying machine 1 receives an input via external extension unit 31 and data from an external device, such as a personal computer 32, is printed by printer PRT. In the copy application, printer PRT prints at a resolution of 400 dpi (dots/inch). In the printer application, printer PRT prints at a resolution of 600 dpi (dots/inch). The resolutions can be switched by changing the rotation speed of the polygon mirror described later. The aforementioned values of the resolutions are exemplary and thus the resolutions are not limited to the aforementioned values.

Image reader IR includes: a scan system 10 for scanning to read an original mounted on an original supporting glass 18; an image signal processing unit 20 for processing an image signal for an image obtained by reading the original; a memory unit 30 for storing as image data the image signal for the image of the original processed by image signal processing unit 20; and an automatic document feeder 500 pivotably mounted on the upper surface of image reader IR with a backside thereof as a fulcrum.

Scan system 10 is a line scanning, image reading mechanism, in which a scanner 19 provided with an original illuminating lamp 11 and a mirror 12 is moved for scanning in the direction indicated by the arrow to successively illuminate an image plane of an original mounted on original supporting glass 18 and the reflected light is projected onto an image sensor 16 via fixed mirrors 13a and 13b and a projection lens 14. Image sensor 16 is a line sensor having a plurality of photoelectric conversion elements arranged in a line, and each photoelectric conversion element (i.e., each pixel) outputs an image signal depending on the quantity of light received.

Image signal processing unit 20 converts the image signal output from each photoelectric conversion element into a digital signal for various signal processings. Memory unit 30 stores the digital signal as image data. Image signal processing unit 20 and memory unit 30 will be described later.

Automatic document feeder 500 includes a sheet feeding roller 501, a sorting roller 502, a sorting pad 503, an intermediate roller 504, a registering roller 505, a transport belt 506, a reversing roller 507, a switching claw 508, a sheet feeding roller 509, an original stacker 510, an original discharging tray 511, an original scale 512, an original sensor SE50 for detecting whether an original is present, an original size sensor SE51, and a discharge sensor SE52.

In automatic document feeder 500, an original set on original stacker 510 is transported by sheet feeding roller 501, sorting roller 502, sorting pad 503, intermediate roller 504, registering roller 505 and transport belt 506 onto original supporting glass 18. Furthermore, in automatic document feeder 500, a read original is discharged by transport belt 506 and discharging roller 509 onto original discharging tray 511.

In copying a plurality of originals, for example, an operator sets originals by stacking them on original stacker 510 which their front sides facing upward. The originals on original stacker 510 are successively drawn one by one from the top original (i.e., the first original) and precisely set at the reading position on original supporting glass 18 with the front sides facing downward. In the one-side original mode for reading only the front side of an original, the original is transported in the left direction in FIG. 1 when image reader IR has finished reading. The original is then discharged onto original discharging tray 511 with the front side facing upward. In the both-side original mode, an original transported in the left direction after image reader IR has finished reading the front side is turned over by reversing roller 507 and returned to the reading position on original supporting glass 18. Then, the original has its back side read and is then again transported in the left direction and discharged onto original discharging tray 511.

Printer PRT prints a copy image by electrophotography process, based on image data transferred from image reader IR.

An operation of printer PRT will now be described. Printing processing unit 40 reads image data from memory unit 30 and provides the image data to a print head 60. In print head 60, a semiconductor laser 62 is driven according to the image data and an laser beam modulated according to the image data is emitted. The laser beams is deflected by a polygon mirror 65 and guided onto an exposure position on a photoreceptor drum 71 via a lens 69 and various mirrors 67a, 68 and 67c.

Photoreceptor drum 71 is carried such that it can be rotatably driven in the counterclockwise direction in the figure. As photoreceptor drum 71 rotates in such a manner, the electrophotography process is performed. More specifically, photoreceptor drum 71 has its surface uniformly charged by means of a corona charger 72, and is exposed to the aforementioned laser beam at the exposure position. The exposure to the laser beam allows the formation of an electrostatic latent image corresponding to the image data on photoreceptor drum 71. The electrostatic latent image is developed by a developing device 73 to provide a toner image which is transferred at a transfer position by a transfer charger 74 from photoreceptor drum 71 to a printing sheet. After the toner image is transferred, the residual toner on photoreceptor drum 71 is collected by a cleaning device 76.

Printing sheets are housed in sheet cassettes 80a and 80b depending on the size. The printing sheets are successively sent out one by one by a sheet feeding roller provided at an upper side of the cassettes, and transported to the transfer position via a timing roller 82. A printing sheet, onto which a toner image has been transferred at the transfer position, is separated by a separation charger 75 from photoreceptor drum 71 and sent to a fixing roller 84 by a transport belt 83. After the toner image is fixed on the sheet, the sheet is discharged by a discharging roller 85 to the outside of the machine. It should be noted that the sizes of printing sheets housed in sheet cassettes 80a and 80b are detected by sheet size detection sensors SE11 and SE12, respectively.

A printing sheets discharged to the outside of the machine is transported to a reverser device 600 with switching claw 601, 604 which operates depending on the print mode to guide the printing sheet to discharge tray 621, 631. Normally (i.e., in the upward-facing mode), a printing sheet is guided onto the upper surface of switching claw 601 and discharged onto discharging tray 621 which the image-formed side facing upward.

When the downward-facing mode is set, a printing sheet is guided to a side of switching claw 601 and transported to a lower transport roller 603 which receives the printing sheet and further transports it downward. Then transport roller 603 is reversely driven and transports the print sheet upwards. The printing sheet transported upwards is guided by switching claw 604 and discharged onto discharging tray 631. This allows the printing sheet to be discharged onto the discharging tray with the image-formed side facing downward.

As can be understood from the description above, printing sheets are stacked on discharging tray 621 with the image-formed sides facing upwards in the upward-facing mode. Thus, in the copy application, image reader IR reads originals successively from the first page to the last page and temporarily stores the image data of all of the originals in memory unit 30. Then, the image data are read successively starting from that of the last page, and printed by printer PRT. In the printer application, the image data from the first page to the last page are all received via external extension unit 31. The image data of all the pages are temporarily stored in memory unit 30 and then read successively from the image data of the last page and printed by printer PRT. This allows printing sheets to be stacked on discharging tray 621 with their page numbers in the proper order.

In the downward-facing mode, printing sheets are stacked on discharging tray 631 with their image-formed sides facing downwards. Thus, when image reader IR has finished reading the first page or received the image data of the first page, a printing operation is started. The original on the next page is then read or received during this printing operation, and the reading or receiving is thus provided simultaneously with printing. This allows the printing sheets to be stacked on discharging tray 631 with their page numbers in the proper order.

When the both-side printing mode is set, a printing sheet is switched back by transport roller 603, again sent into the machine and transported to the transfer position by transport rollers 86a, 86b and 86c for copying on the back side.

The present digital copying machine 1 is also capable of copying in the weekly-magazine binding mode. When the weekly-magazine binding mode is set in the copy application, image reader IR successively reads originals from the first page to the last page and the image data of all of the originals are temporarily stored in memory unit 30. The image data are read with the paging order changed, and printed by printer PRT. In the printer application, the image data from the first page to the last page are successively received via external extension unit 31 and the image data of all of the pages are temporarily stored in memory unit 30. The image data are read with the paging order changed, and printed by printer PRT. Printer PRT copies the images of originals, two arranged for each of the front side and back side of one printing sheet. Thus, placing the printed printing sheets on one another, folding them along the center line and binding them at the center crease allows a printed matter in a book paged like a weekly magazine. The weekly-magazine binding mode is detailed in the U.S. patent application No. 08/739,916, which is incorporated herein by reference.

Figure 2:
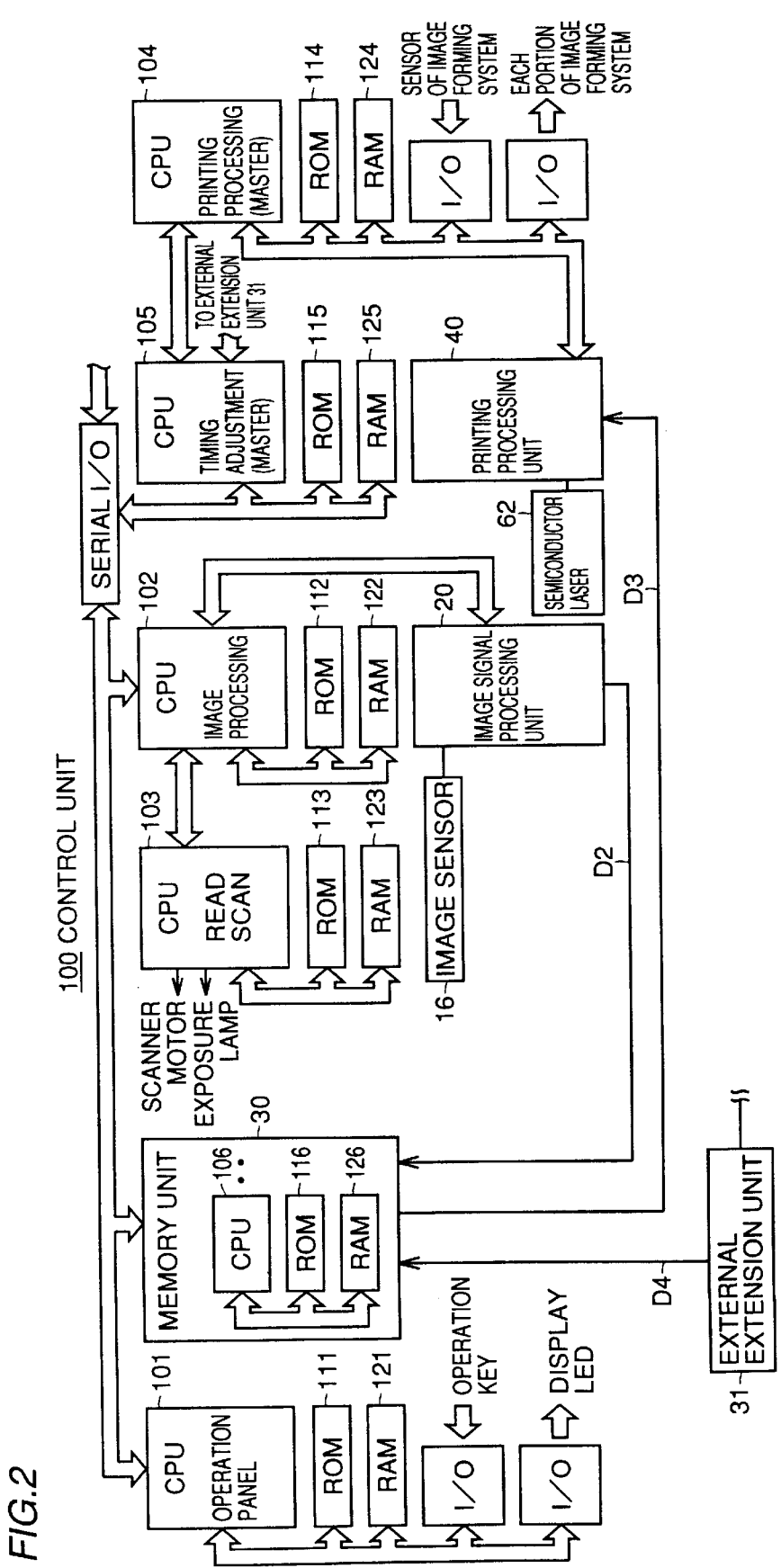
FIG. 2 is a block diagram showing a configuration of a control unit of the copying machine.
Figure 3:
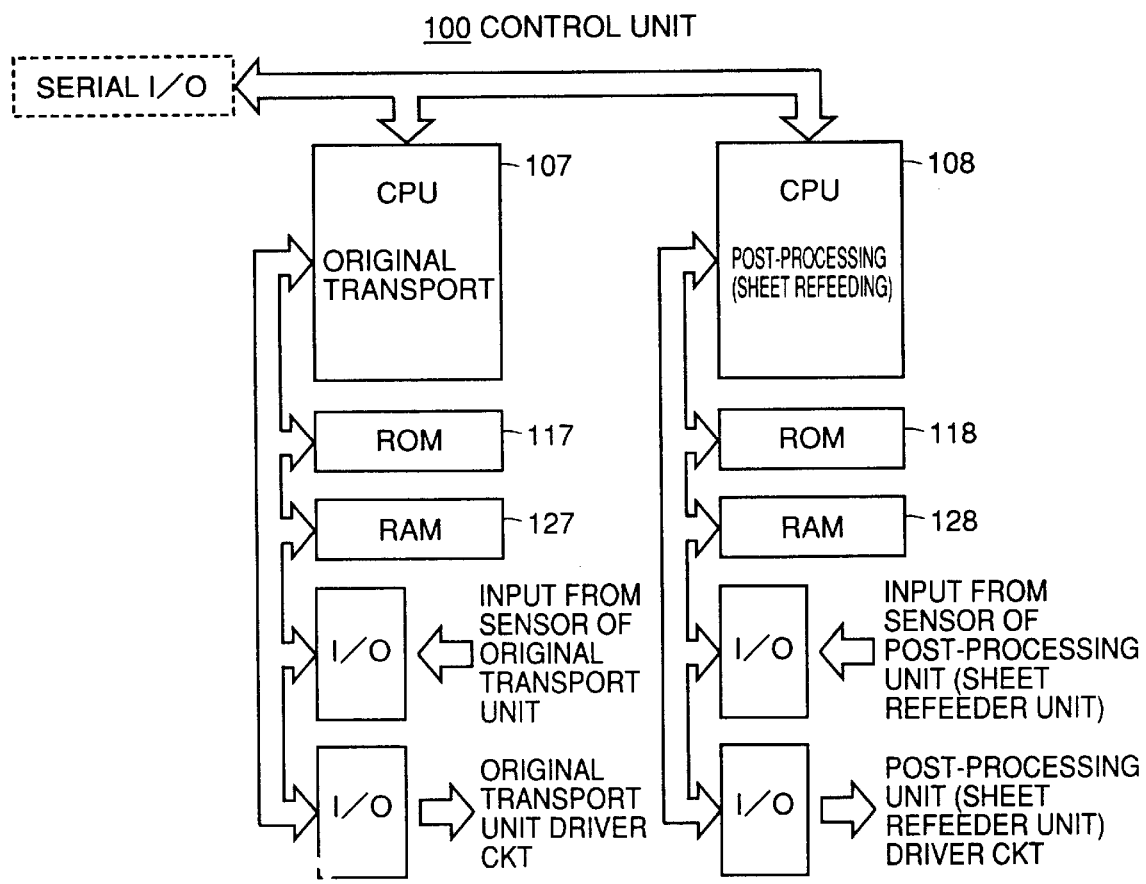
FIG. 3 is a block diagram showing a configuration of the control unit of the copying machine.

A control unit 100 for providing various controls of copying machine 1 will now be described with reference to FIGS. 2 and 3. Control unit 100 includes eight microcomputers (referred to as CPUs hereinafter) CPUs 101–108, ROM (Read Only Memory)s 111–118 for storing a program of each of CPUs 101–108, and RAM (Random Access memory)s 121–128 for storing parameters and the like. CPU 106 is provided within memory unit 30.

CPU 101 controls signal inputs from various operation keys on an operation panel as well as displaying on the operation panel. CPU 102 controls each portion of image signal processing unit 20. CPU 103 controls the driving of scan system 10. CPU 104 controls a page printer PRT including printing processing unit 40. CPU 105 provides the general timing adjustment for control unit 100 and a processing for setting modes of operation. Thus, CPU 105 performs serial communication with the other CPUs to transmit and receive commands and reports required for control. CPU 105 also performs external serial communication with external extension unit 31 and transmits and receives a timing signal required for print control and a printing mode to deal with printing of externally received data in the printer application. CPU 106 controls the storing and reading of image data. CPU 107 controls the transporting of originals by automatic document feeder 500. CPU 108 controls a post-processing device 600.

Figure 4:
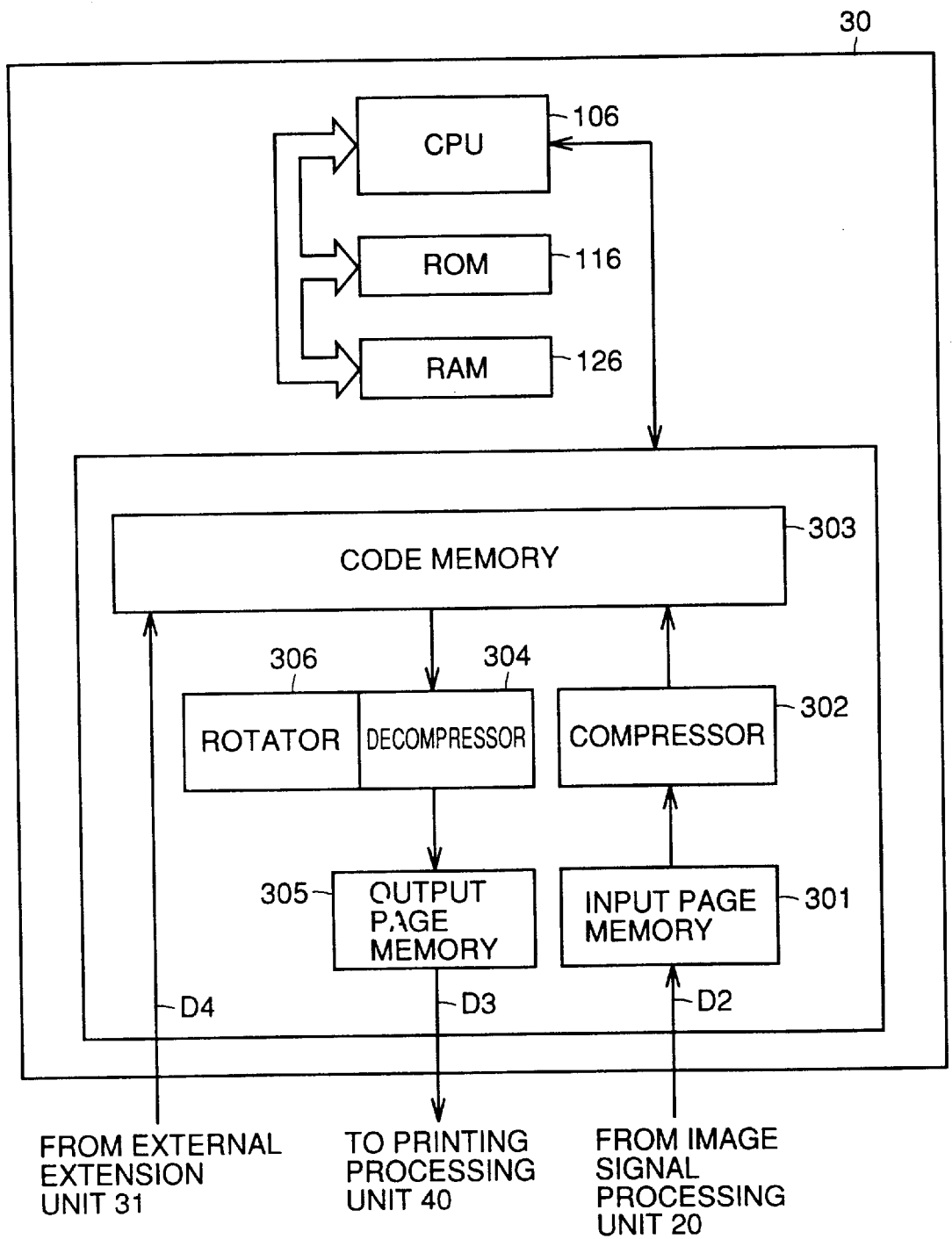
FIG. 4 is a block diagram showing a configuration of a memory unit.

Referring to FIG. 4, memory unit 30 includes an input page memory 301, a compressor 302, a code memory 303, a decompressor 304, an output page memory 305, a rotator 306, CPU 106, ROM 116 and RAM 126.

In reading an original in the copy application, image data D2 read by image reader IR is transferred to input page memory 301, compressed by compressor 302 for each page and transferred to code memory 303.

In receiving image data in the printer application, print data is transmitted from personal computer 32 to external extension unit 31 which controls the compressing of the print data and then transfers the compressed image data D4 to code memory 303.

In printing, compressed image data (i.e., image data read by image reader IR or image data received from external extension unit 31) stored in code memory 303 is decompressed by decompressor 304. If image rotation is required, rotation processing is provided in the decompression by rotator 306 for each page.

The decompressed image data is transferred to output page memory 305 which transfers image data D3 to printing processing unit 40. The image data transfers indicated by the arrows in the figure are independent from one another and can be operated in parallel to improve copying speed. Each image data is DMA-transferred by a DMA controller (not shown).

CPU 106 controls memory unit 30 according to a program stored in ROM 116. RAM 126 stores a parameter and the like required for operating the program.

Code memory 303 for temporarily storing image data is managed by a management table provided within RAM 126.

Figure 5:
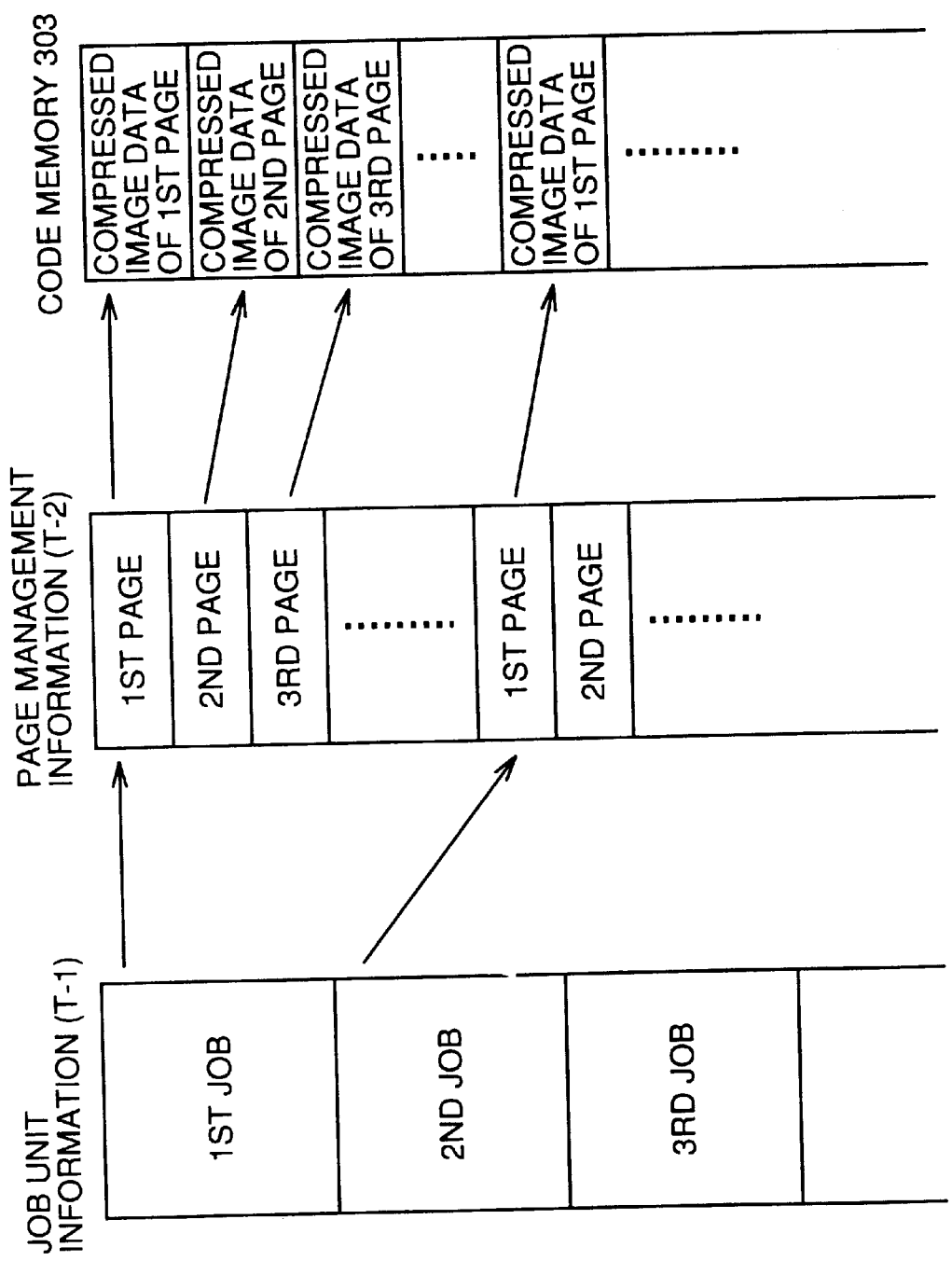
FIG. 5 is a schematic diagram of a management table illustrating a relation between a job and a code memory.

The management table will now be described with reference to FIG. 5. Image data which is compressed after an original is read, or externally received image data is managed for each print job. A print job is a set of image data of one page or a plurality of pages printed by printer PRT in a series of printing operations. A print job in the copy application is the image data of a group of originals successively read by image reader IR, and a print job in the printer application is the image data of one page or a plurality of pages successively received. A plurality of pages are divided and stored in one print job. Thus, the management table includes page management information (T-2) as a table for storing information divided for each page, and print job unit information (T-1) as a table for storing information for each print job.

Print job unit information (T-1) stores a job ID, the registration state of the print job, the address for storage of the page management information corresponding to the print job, and the number of sheets designated, the number of copies designated and the type of print mode, such as the both-side printing, for the print job and the like. Page management information (T-2) stores addresses for storage of compressed image data.

In reading an original in the copy application according to an direction from CPU 105, CPU 106 reads image data from input page memory 301 while forming information for the management table. CPU 106 also controls compressor 302 and stores compressed image data into code memory 303.

In printing image data, CPU 106 refers to the information in the management table and reads the compressed image data from code memory 303. The information of the page of interest is accurately read from the information within the management table, and erased when the number of sheets and the number of copies designated by an operator have been printed.

Figure 6:
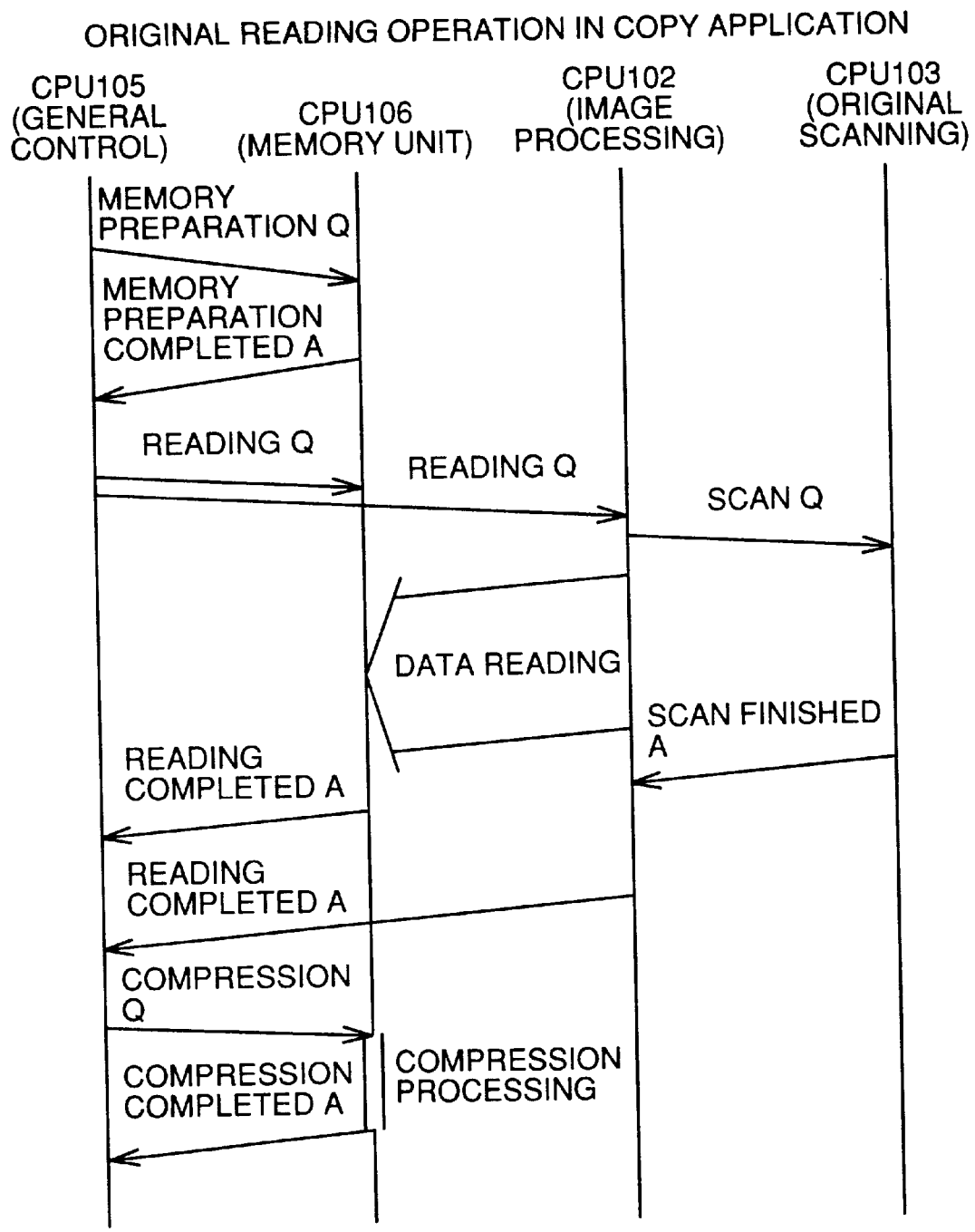
FIG. 6 schematically illustrates a sequence of the original reading operation in the copy application.
Figure 7:
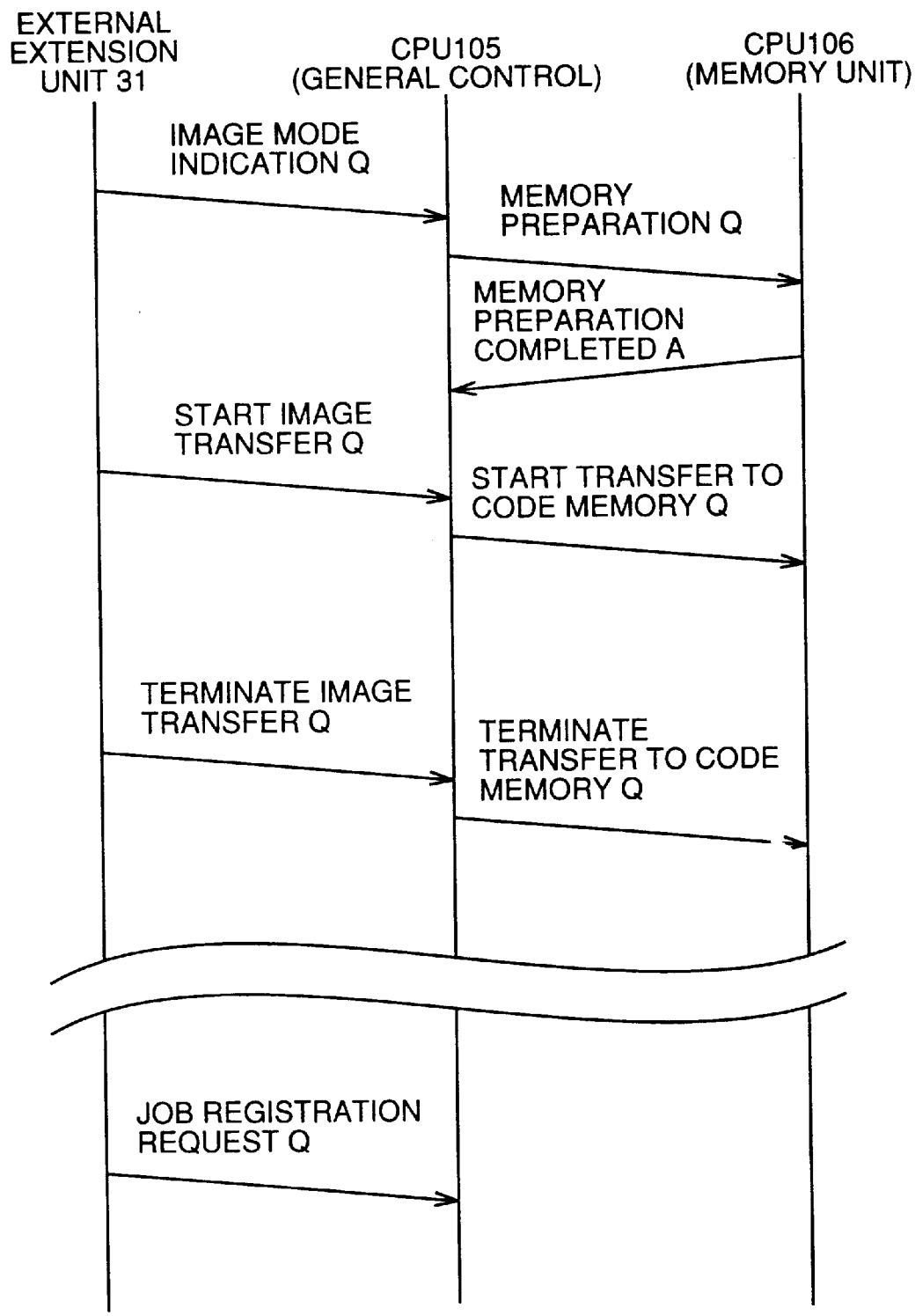
FIG. 7 schematically illustrates a sequence of the image data receiving operation in the printer application.
Figure 8:
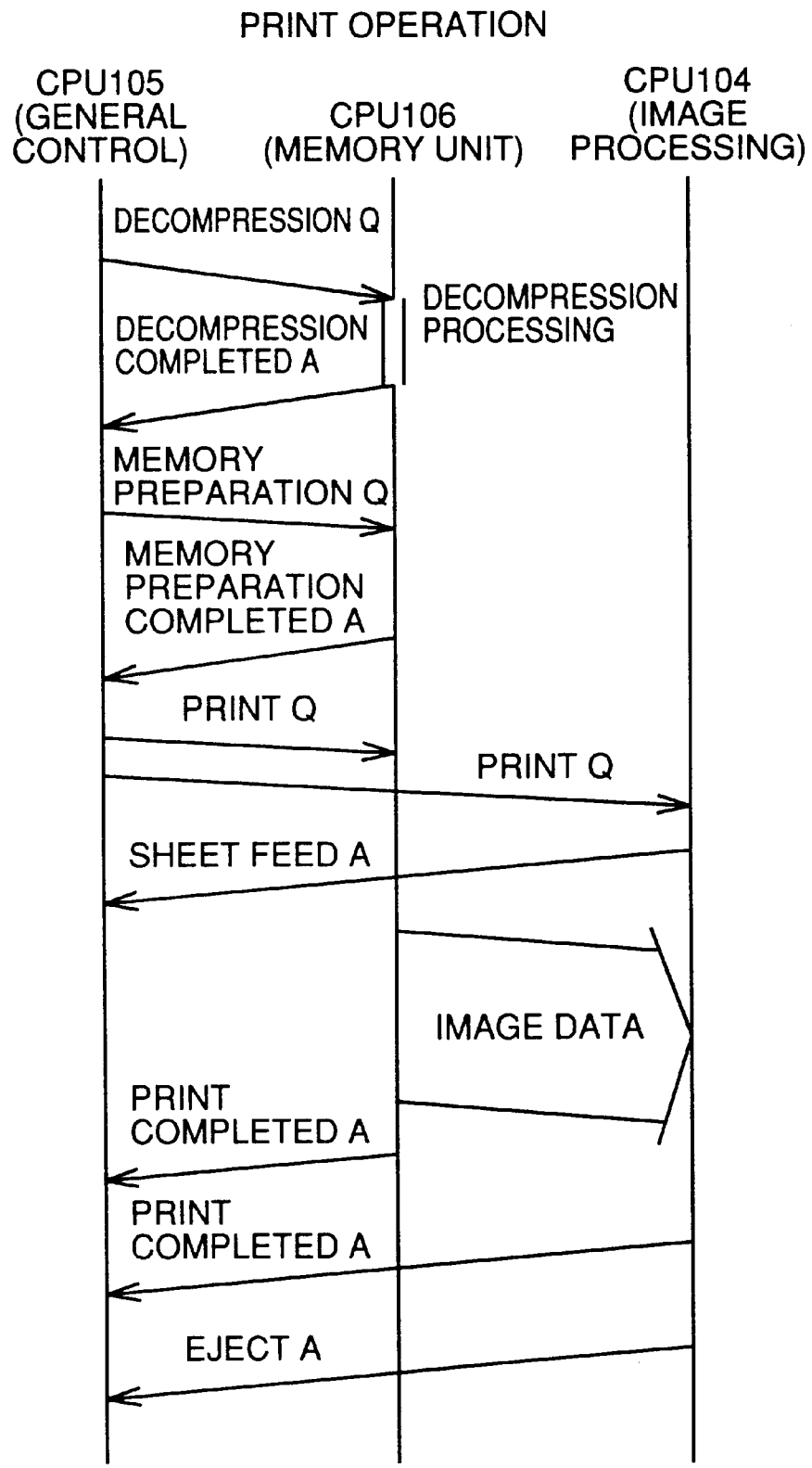
FIG. 8 schematically illustrates a sequence of the printing operation.

Referring to FIGS. 6–8, the original reading in the copy application, image data reception in the printer application, and an operation sequence of digital copying machine 1 as to printing will now be described mainly with respect to request commands (Q), reports (A) or a data stream among CPUs 101–106.

Referring to FIG. 6, image data is transferred from image signal processing unit 20 to memory unit 30 in the original reading operation in the copy application.

First, CPU 105, which generally controls the sequence, issues a memory preparation command to CPU 106. Responsively, CPU 106 sets for an internal hardware a bus connection state for transferring image data D2 from image signal processing unit 20 to memory unit 30. When the setting is completed and the preparation is thus completed, CPU 106 transmits a memory-preparation completion reporting signal to CPU 105.

When CPU 105 issues a read command to CPU 106 and 102, CPU 102 issues a scan command to CPU 103.

CPU 103 responsively starts a reading scan. When scanner 19 reaches an image region, read data (image data D2) is transferred from image signal processing unit 20 to memory unit 30 according to an image processing mode set by CPU 102.

When the scanning is completed and CPU 102 and CPU 106 transmit a signal for reporting that a reading is completed, CPU 105 issues to CPU 106 a compression command which requests data compression. CPU 106 responsively initiates unit portion, such as input page memory 301, compressor 302 and code memory 303. This allows the compression processing and coded data (compressed image data) is stored in code memory 303. When the compression processing is completed, CPU 106 notifies CPU 105 that a compression is completed by a compression completion reporting signal. The aforementioned processing is performed for all of the originals to be printed. When the aforementioned processing is performed for a predetermined number of sheets of originals which satisfies the print starting condition described later, CPU 105 registers in the print waiting table within RAM 125 a job ID indicating the image data stored in code memory 302 as a print job which waits for printing.

Referring to FIG. 7, in the image data receiving operation in the printer application, an external extension unit 31 transfers compressed image data to memory unit 30.

First, external extension unit 31 sends an image-mode indication command to CPU 105. The command externally designates sheet size, sheet feeding source, print mode and the like. When CPU 105 receives the command, a memory preparation command is issued to CPU 106. Responsively, CPU 106 sets for the internal hardware a bus connection state for transferring image data D4 from external extension unit 31 to memory unit 30. When the setting is completed and the preparation is thus completed, CPU 106 transmits to CPU 105 a signal for reporting that preparation of the memory is completed.

External extension unit 31 issues to CPU 105 an image-transfer start command which indicates that the transfer of the image data of one page is started. CPU 105 issues to CPU 106 a command for starting transfer to the code memory to directly transfer compressed image data D4 to code memory 303. When external extension unit 31 finishes the transfer of the compressed image data D4 of the one page, an image-transfer end command is issued to CPU 105. CPU 105 responsively issues to CPU 106 a command to terminate transfer to the code memory. Thus, the compressed image data D4 of the one page received from external extension unit 31 is stored in code memory 303. The aforementioned operation is repeated for each of pages to be printed. When the aforementioned processing is performed for a predetermined number of pages which satisfies the print starting condition described later, external extension unit 31 transfers a job registration request command to CPU 105. Furthermore, CPU 105 registers in the print waiting table within RAM 125 a job ID indicating the image data stored in code memory 302 as a print job waiting for being printed.

Referring to FIG. 8, in the print operation, image data is read from code memory 303 and an image is printed on a sheet according to the image data.

First, when CPU 105 selects one of print jobs waiting for being printed that are stored in the print waiting table within RAM 125, CPU 105 issues to CPU 106 a decompression command to request data decompression. CPU 106 initiates various portions, such as code memory 303, decompressor 304, rotator 306 and output page memory 305, and provides a decompression processing of the image data of the selected print job. Thus, image data is written into output page memory 305.

When the decompression processing is completed, CPU 106 notifies CPU 105 that a decompression has been completed by means of a decompression completion reporting signal.

CPU 105 issues to CPU 106 a memory preparation command for reading the image data from output page memory 305. CPU 106 sets for the internal hardware a bus connection state, a rotation processing and the like for outputting image data D3 from output page memory 305 to printing processing unit 40.

When the aforementioned setting is completed and the preparation is thus completed, CPU 106 issues to CPU 105 a signal for reporting that the memory preparation has been completed. In response to the signal, CPU 105 issues a print command to CPUs 106 and 104. According to the print command, CPU 104 provides printing. If it is determined in the print processing that resolution need be changed, CPU 106 controls the rotation speed of polygon mirror 65 to rotate polygon mirror 65 at a speed according to the resolution. More specifically, CPU 106 rotates polygon mirror 65 at a rotating speed corresponding to 400 dpi for the print operation in the copy application and 600 dpi in the printer application. CPU 104 sends to CPU 105 a sheet-feeding reporting signal for informing CPU 105 of the transport state of a sheet. Then, image data D3 read from input page memory 305 is output to printing processing unit 40 and printing is provided.

When the printing is completed, CPU 106 transmits a print completion reporting signal to CPU 105 and CPU 104 transmits a print completion reporting signal and an eject completion reporting signal to CPU 105. CPU 105 receives the reports and then provides a memory clear request to CPU 106 as required.

Referring to the flow charts shown in FIGS. 9–14, an operation of digital copying machine 1 will now be more specifically described mainly with respect to a control characterized according to the present invention.

Figure 9:
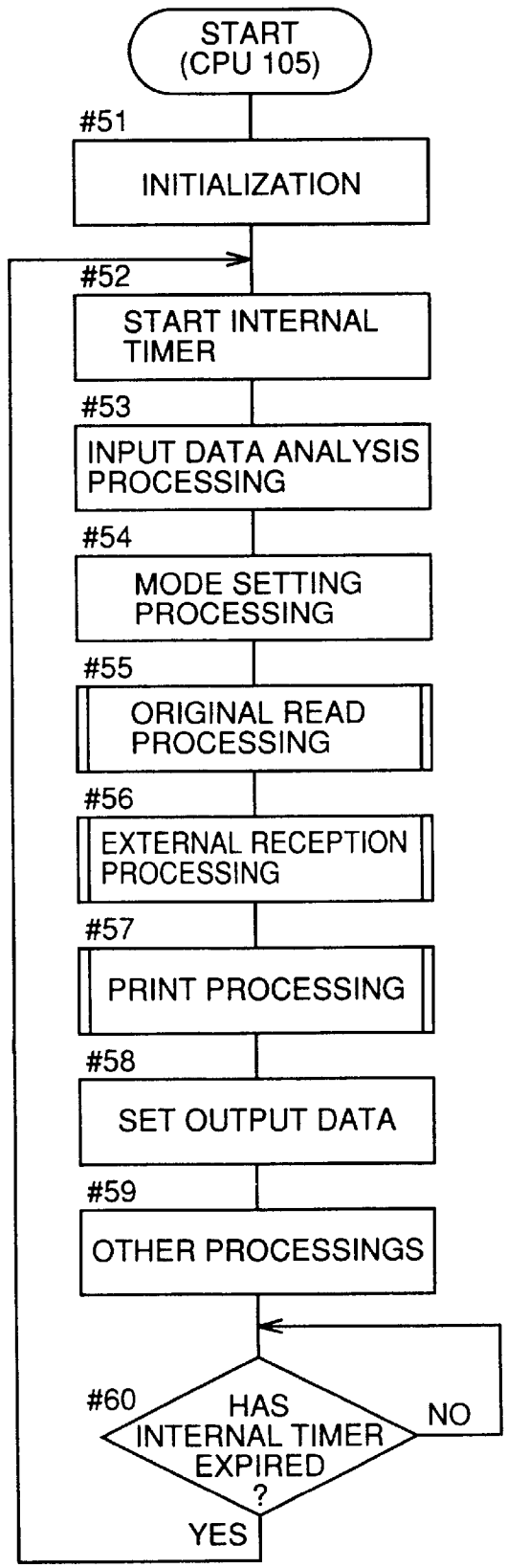
FIG. 9 is a flow chart of a main routine of CPU 105.

Referring to FIG. 9, upon power-on, CPU 105, which directs the control of digital copying machine 1, provides initialization (#51), and then repeats starting an internal timer (#52), an input data analysis processing for checking input data from the other CPUs (#53), a mode-setting processing for setting a mode of operation according to the content of a setting from the operation panel (#54), an original read processing for performing an original read operation in the copy application (#55), an external reception processing for receiving image data from external extension unit 31 in the printer application (#56), a print processing for providing printing in printer PRT (#57), an output data setting for communicating commands and reports (#58), other processings (#59) and the determination whether the internal timer has expired (#60).

Figure 10:
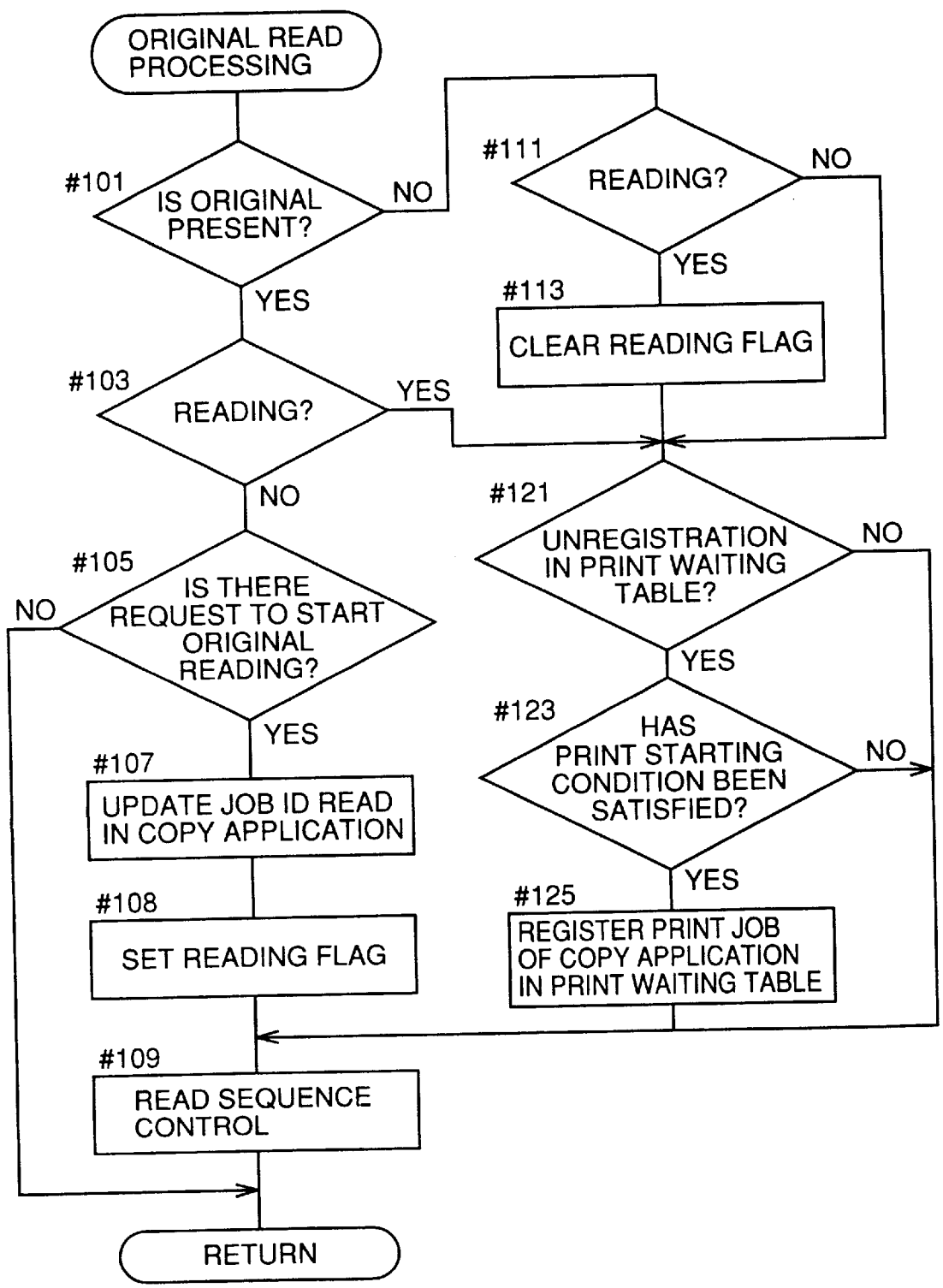
FIG. 10 is a flow chart of a read processing in the copy application.

Referring to FIG. 10, the original read processing (#55) in the copy application shown in FIG. 9 will now be more specifically described. In this routine, an original is read in the copy application, and a job ID is registered in the print waiting table as a print job waiting for being printed when the print starting condition is satisfied.

First, CPU 105 checks whether an original is present on original stacker 510 (#101). If any original is present (YES at #101), the current reading state is determined (#103). If any original is not being read (NO at #103), CPU 105 inquires of CPU 101 whether a command to start a new original reading has already been received from the operation panel (#105). If a command to start the reading has already been received (YES at #105), CPU 105 updates job ID (#107), sets a reading flag for indicating a reading is being provided (#108) and controls a reading sequence (#109). In the reading sequence control, CPU 105 communicates the aforementioned commands and reports with CPUs 106, 102 and 103 to compress the image data of a plurality of originals for each page and successively register the image data in the aforementioned management table and code memory 303.

When there remain no originals (NO at #101) and the reading flag is still set (YES at #111), CPU 105 determines that the reading of all of the originals has been completed, cancels the reading flag (#113) and registers the image data in the print waiting table, as required, in the processings for determining whether the print starting condition described later has been satisfied (#121, #123 and #125).

If the current read operation is providing a reading (i.e., if the reading flag is set) (YES at #103), CPU 105 determines whether the registration of the job ID corresponding to the image data for which reading is currently being provided has already been completed in the print waiting table (#121). If the job ID has not yet been registered (YES at #121), CPU 105 determines whether the print starting condition has been satisfied (#123). If the print starting condition has been satisfied (YES at #123), CPU 105 registers the job ID in the print waiting table (#125). The read sequence control is provided (#109).

If the job ID has already been registered in the print waiting table (NO at #121) or the print starting condition is not satisfied (NO at #123), CPU 105 provides the read sequence control without providing the processing at #125.

Figure 11:
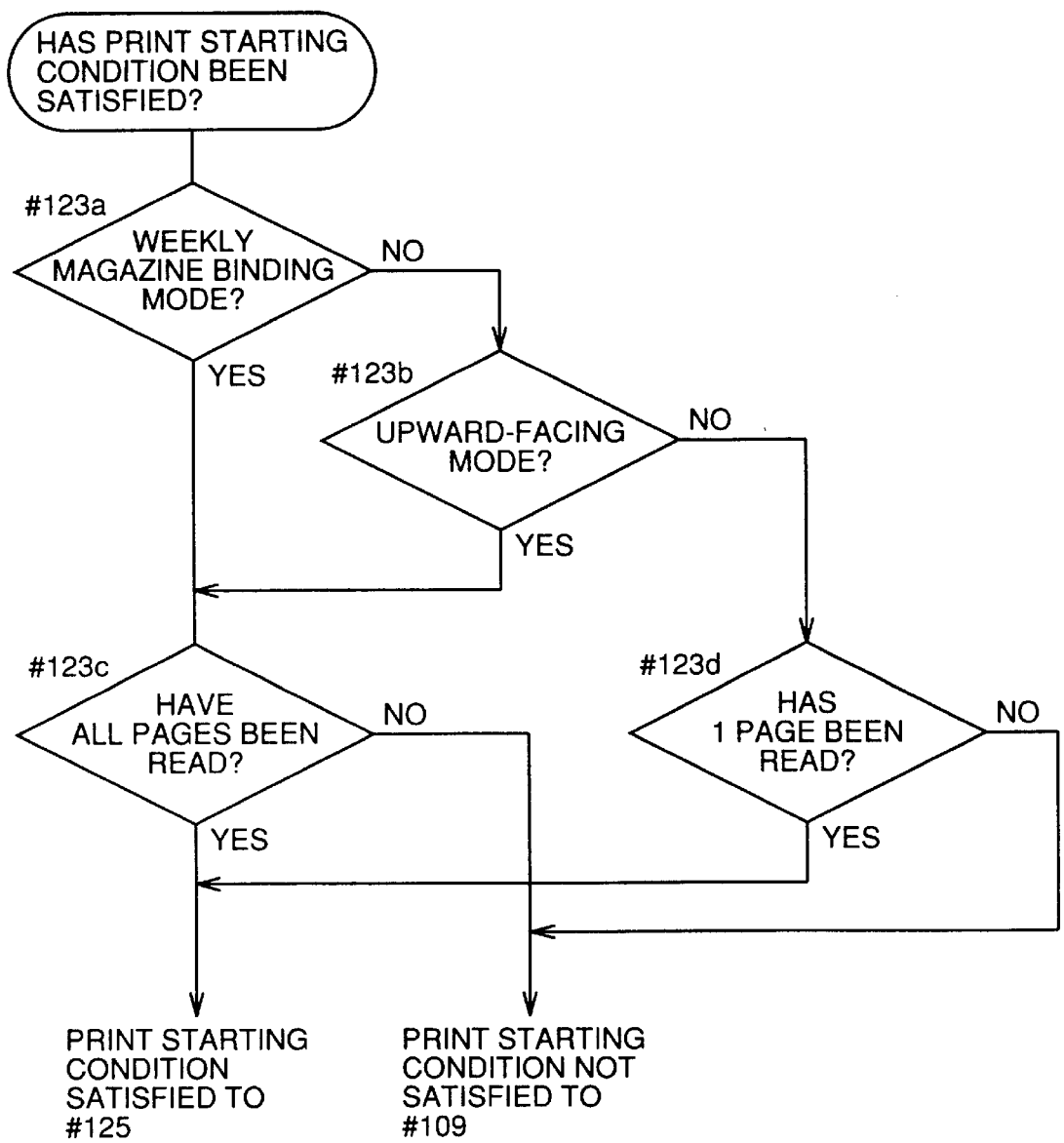
FIG. 11 is a flow chart of a processing for determining whether a print starting condition has been satisfied in the copy application.

The condition for the decision as to whether the aforementioned print starting condition has been satisfied (#123) varies depending on whether a mode is that incapable of printing unless the reading of all of originals is completed or that capable of printing during reading depending on the print mode. More specifically the processing here is as shown in FIG. 11. For printing in the weekly magazine binding mode (YES at #123a) or the upward-placing mode (YES at #123b), it is not until all of originals have been read that page printer PRT can start printing, as has been described above. Thus, it is determined in the weekly magazine binding mode or the upward-facing mode that the print starting condition is satisfied when reading of all originals is completed (YES at #123c). In another mode, i.e., the downward-facing mode (NO at #123a and NO at #123b), page printer PRT can start printing when the reading of the original of the first page is completed (YES at #123d). Thus, it is determined that the print starting condition is satisfied when the reading of the original of the first page is completed.

Due to the aforementioned processing, no print job is registered in the print waiting table in the copy application until an original is read and a print operation can be performed. Accordingly, resolution is not switched until printer PRT is about to perform the print operation. That is, for the weekly magazine binding mode or the upward-facing mode, after the reading of all originals is completed and printing can be performed, a print job is registered in the print waiting table and printing is performed. Resolution is switched in this print performing stage. By contrast, for other modes, after the reading of an original of one page is completed and printing can be performed, a print job is registered in the print waiting table, printing is performed and resolution is switched.

Thus, if the operation in the copy application is started with a resolution of 600 dpi set by the printer application executed before an original is read in the copy application, the resolution of 600 dpi is maintained until the print starting condition for the started copy application is satisfied. Thus, when the print starting condition for the printer application newly applied is satisfied before the print starting condition for the copy application is satisfied, the printing of image data of the printer application can be started without changing the resolution. Thereafter, when the print starting condition for the copy application is satisfied, the resolution is switched to 400 dpi and printing is performed. Thus the frequency of resolution switching in page printer PRT is reduced.

Figure 12:
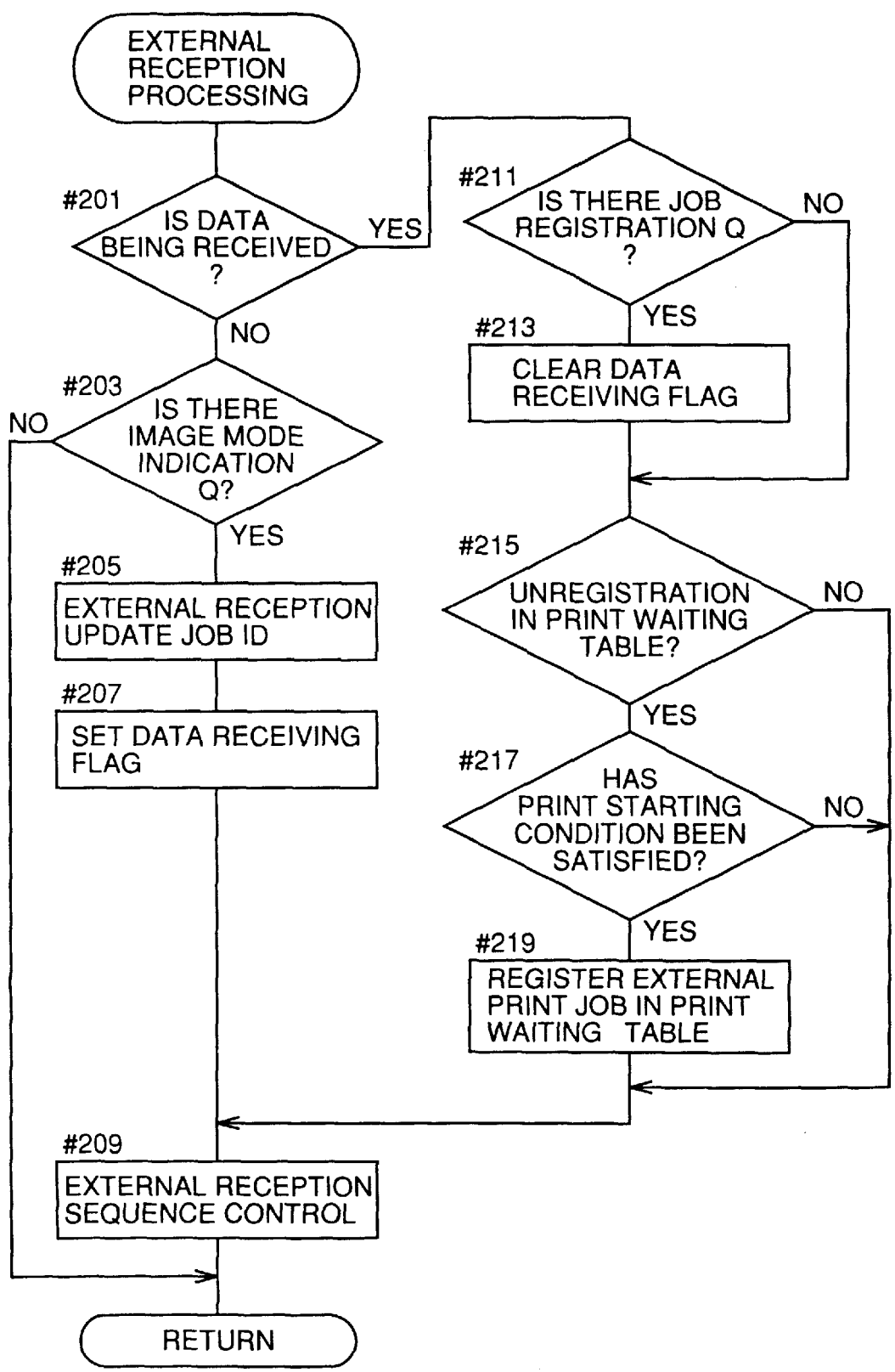
FIG. 12 is a flow chart of a processing for receiving image data in the printer application.

Referring to FIG. 12, the external reception processing (#56) of image data in the printer application shown in FIG. 9 will be more specifically described. This routine provides a processing for registering in the print waiting table a print job for externally received image data. CPU 105 determines whether data is being received (#201). If data is not being received (NO at #201), CPU 105 determines whether an image mode indication command has been received from external extension unit 31 (#203). If the command has not yet been received, image data reception has not yet been started and thus CPU 105 ends the external reception processing (#56) and successively performs the print processing (#57). If the command has already been received (YES at #203), it is determined that image data reception is started and CPU 105 updates job ID (#205), sets a data receiving flag for indicating that data is being received (#207), and performs an external reception sequence control (#209). In the external reception sequence control, CPU 105 successively registers the externally received data of a plurality of pages in the aforementioned management table and code memory 303.

If data is being received (YES at #201), CPU 105 determines whether a job registration request command has been received from external extension unit 31 (#211). If the command has already been received (YES at #211), it is determined that all of external image data have been received and CPU 105 cancels the data receiving flag (#213). If the command has not yet been received (NO at #211), CPU 105 does not cancel the data receiving flag. CPU 105 also determines whether job ID has already been registered in the print waiting table (#215). If job ID has not yet been registered (YES at #215), CPU 105 determines whether the print starting condition has been satisfied (#217). If the print starting condition has been satisfied (YES at #217), CPU 105 registers job ID in the print waiting table (#219). If job ID has already been registered in the print waiting table (NO at #215) or the print starting condition has not yet been satisfied (NO at #217), nothing is performed by CPU 105. CPU 105 then performs the external reception sequence control (#209).

The decision as to whether aforementioned print starting condition has been satisfied (#217) can be made depending on whether the print mode is a mode incapable of printing unless all image data have been received or a mode capable of printing while receiving image data, as is in the copy application. More specifically, personal computer 32 generally transmits image data successively from the first page and thus, as has been previously described, printing cannot be started in printing in the weekly magazine binding mode or the upward-facing mode unless the image data of all pages are stored in code memory 302. In another mode, i.e., the downward-facing mode, it is determined that the print starting condition is satisfied when the image data of the first page is stored in code memory 303.

Due to the aforementioned processing, job ID is not registered in the print waiting table in the print application until image data is received and a print operation is allowed, as is in the copy application. Accordingly, resolution is not switched until printer PRT is about to perform the print operation. More specifically, in the weekly magazine binding mode or the upward-facing mode, all of the pages of image data are received and then its job ID is registered in the print waiting table and printing is performed. This printing performance allows resolution switching. By contrast, in other modes, after the first page of image data is received and printing is allowed, its job ID is registered in the print waiting table and resolution is switched.

Thus, if the operation of the printer application is started with a resolution of 400 dpi set by the copy application executed before image data is received in the printer application, the resolution of 400 dpi is maintained until the print starting condition for the started printer application is satisfied. Thus, if the print starting condition for the copy application newly applied is satisfied before the print starting condition for the printer application is satisfied, printing in the copy application is started without changing the resolution. Thereafter, when the print starting condition for the printer application is satisfied, the resolution is switched to 600 dpi and printing is performed. Thus, the frequency of resolution switching in page printer PRT is reduced.

Figure 13:
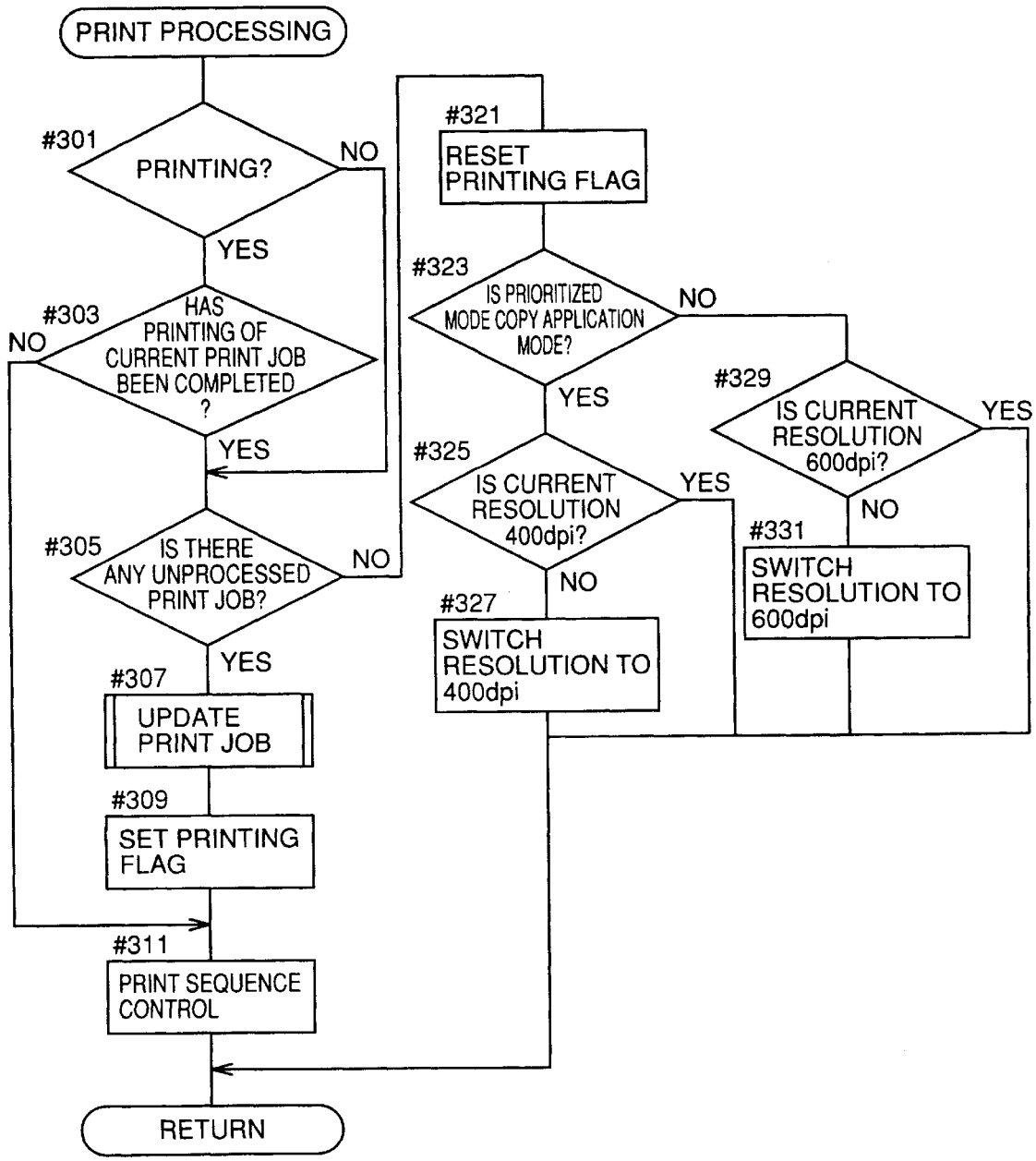
FIG. 13 is a flow chart of a print processing.

Referring to FIG. 13, the print processing (#57) shown in FIG. 9 will be more specifically described. In this routine, a print job related to printing is read and a print sequence control is performed.

First, CPU 105 determines whether printing is being performed (#301). If printing is being performed (YES at #301), CPU 105 determines whether all pages of a print job being currently printed (referred to as a "current print job" hereinafter) have been printed (#303). If the printing has been completed (YES at #303), it is determined whether any unprocessed print job is present in the management table (#305). An unprocessed print job here is, as has been previously described, a print job registered in the print waiting table with the print starting condition satisfied. At #305, print job retrieval is executed in the print waiting table. If any unprocessed print job is present (YES at #305), CPU 105 updates the current print job to execute the unprocessed print job (#307) and sets the printing flag which indicates that printing is being performed (#309). Furthermore, as the print sequence control, CPU 105 communicates the aforementioned commands and reports with CPUs 106 and 104 with respect to registered print jobs. The communication allows CPU 105 to successively read the image data corresponding to the current job from the aforementioned management table and code memory 303 for each page and apply the decompression and printing processings to the image data (#311). If printing is not being performed (NO at #301), no current print job is present and CPU 105 executes #305 and the subsequent processings. If the printing of the current print job has not yet been completed (NO at #303), CPU 105 performs the aforementioned print sequence control (#311).

If no unprocessed job is present (NO at #305), CPU 105 resets the printing flag (#321) and determines the preset, prioritized application mode (#323). If print job in the copy application is prioritized (YES at #323), CPU 105 determines whether the current resolution is the 400 dpi for the copy application (#325). If it is not 400 dpi (NO at #325), resolution switching is executed (#327). If it is 400 dpi (YES at #325), resolution switching is not executed. If print job in the printer application is prioritized (NO at #323), a decision similar to that described above is made and the resolution is switched to 600 dpi as required (#329 and #331).

More specifically, CPU 104 switches the rotating speed of polygon mirror 65 to provide the processing for switching resolutions. It is needless to say that as other methods of providing the processing for switching resolutions, the diameter of the laser beam which illuminates photoreceptor drum 71, the intensity of the laser beam and the like may be changed.

Figure 14:
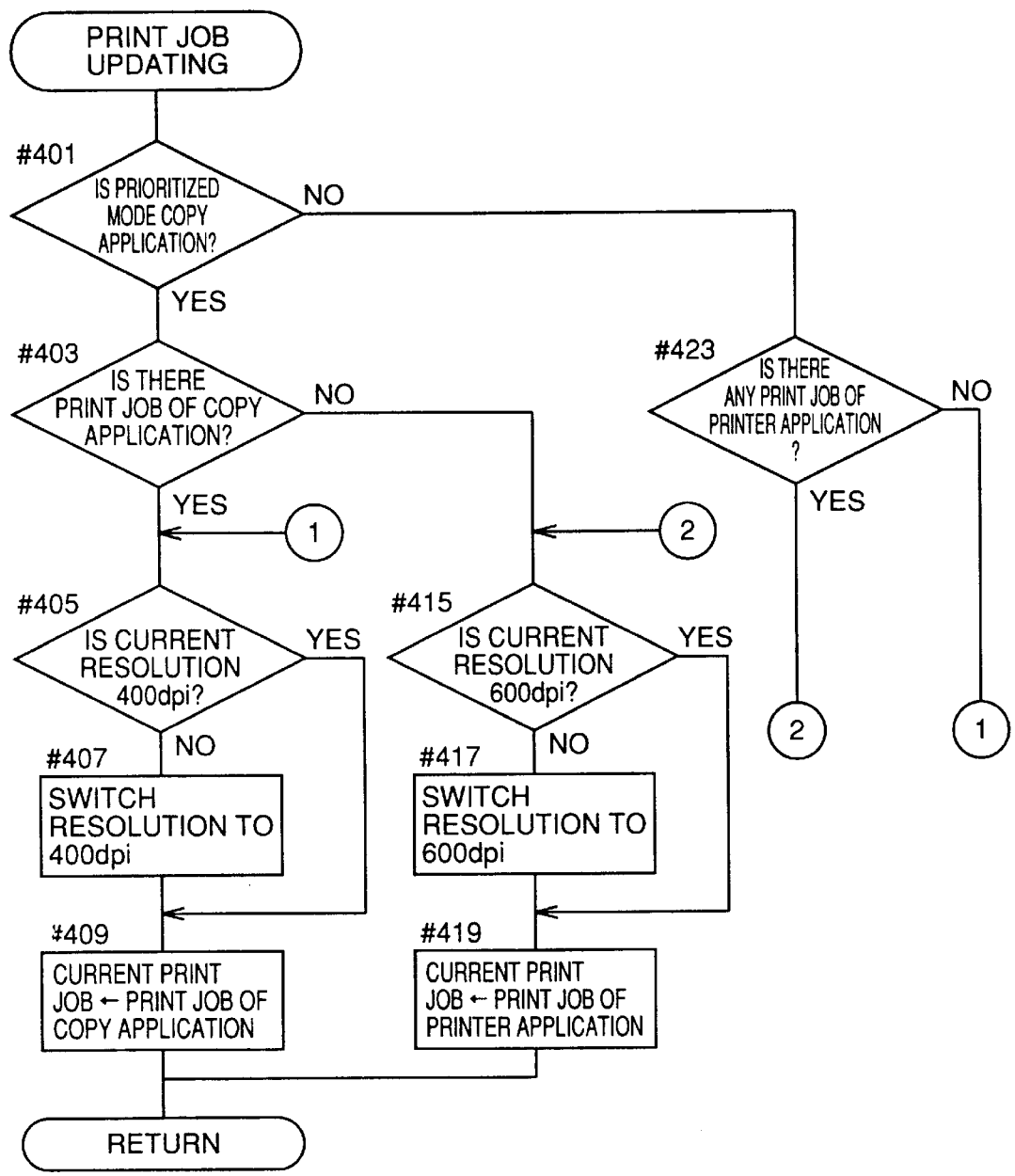
FIG. 14 is a flow chart of a print job updating processing.

Referring to FIG. 14, the print job updating (#307) in FIG. 13 will now be more specifically described. This routine is a processing for switching resolutions depending on the registered print job in the copy application or the printer application. As with the aforementioned print processing, CPU 105 determines the prioritized application mode (#401). If printing in the copy application is prioritized (YES at #401), CPU 105 determines whether there is any unprocessed print job in the copy application (#403). If the printer application is prioritized (NO at #401), CPU 105 determines whether there is any unprocessed print job in the printer application (#423).

If there is an unprocessed print job of the copy application, the resolution is switched as required (#405 and #407). CPU 105 switches the current print job to the unprocessed print job of the copy application (#409). A similar processing is provided to print jobs of the printer application (#415, #417, #419).

As is clear from the above description, in digital copying machine 1, the timing of registration in the print waiting table is changed depending on the print mode. More specifically, in the weekly magazine binding mode and the upward-facing mode, the print starting condition is assumed to be satisfied and the job ID is registered in the print waiting table when all pages of image data are stored in code memory 303. In the downward-facing mode, the print starting condition is assumed to be satisfied and the job ID is registered in the print waiting table when the first page of image data is stored in code memory 303. Accordingly, the timing at which a print processing is practically performed is changed depending on the print mode and resolution switching is performed in the print processing and thus the timing of changing resolutions is changed depending on the print mode.

More specifically, assuming that printing is to be performed in the weekly magazine binding mode in the copy application with the resolution of 600 dpi for the printer mode set, job ID is registered in the print waiting table when all pages of originals are read and the image data are stored in code memory 303. The resolution is switched to 400 dpi at the timing at which the registered print job is executed. By contrast, assuming that printing is about to performed in the downward-facing mode in the copy application with the resolution of 600 dpi for the printer mode set, job ID is registered in the print waiting table when the first page of original is read and the image data is stored in code memory 303. Thus, the registration of the job ID is issued to the print waiting table earlier than the other case, resulting in an earlier timing of resolution switching.

As can be understood from the above, the control for the optimal timing at which resolutions are changed can be provided when a plurality of applications are processed in parallel and this allows rapid printing.

Although the timing at which a resolution is switched in the both-side print mode has not been described, printing can be started in the both-side print mode when at least two pages of image data to be printed on the both sides of a printing sheet are obtained. Thus, a job ID may be registered in the print waiting table when all pages of image data are obtained, as with the weekly magazine binding mode and the upward-facing mode, as has been described above, or when two pages of image data are obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus capable of image formation according to a print mode at different printing resolutions for a plurality of applications, comprising:

a resolution switching controller which controls switching of a printing resolution in response to switching between each of said plurality of applications; and a timing controller which sets a timing of said switching of said printing resolution for said resolution switching controller according to said print mode.

2. An image forming apparatus according to claim 1, wherein said plurality of applications includes:

a copy application for providing image formation by reading image data of an image of an original; and a printer application for providing image formation by externally receiving said image data.

3. An image forming apparatus according to claim 1, further comprising a memory for storing said image data, wherein said print mode includes:

a first print mode in which all pages of said image data are stored into said memory and then are read out from said memory in a first predetermined order to start forming said image from said image data, and a second print mode in which said image data are read from said memory in a second predetermined order to start forming said image from said image data when a predetermined number of pages of said image data for image formation are stored in said memory; and wherein said timing controller sets a timing of switching said printing resolution so as to switch said printing resolution when said image formation from said image data is started.

4. An image forming apparatus according to claim 3, wherein:

said first predetermined order is obtained by rearranging a storing order of said image data into said memory according to a predetermined rule; and said second predetermined order is said storing order of said image data into said memory.

5. An image forming apparatus capable of image formation according to a print mode, wherein said image forming apparatus forms said image from image data obtained from a plurality of image data sources at a different printing resolution for each of said image data sources comprising:

a memory for storing said image data;

a printer for reading said image data from said memory and for forming said image according to said print mode at a printing resolution determined depending on said image data source of said image data;

a resolution switching controller for controlling switching of said printing resolution for said printer; and a timing controller for setting a timing of said switching of said printing resolution for said resolution switching controller according to said print mode.

6. An image forming apparatus according to claim 5, wherein each of said plurality of image data sources includes an image reader and a computer.

7. An image forming apparatus according to claim 5, wherein said print mode includes:
- a first print mode in which all pages of said image data are stored into said memory and then are read out from said memory in a first predetermined order to start forming said image from said image data, and
- a second print mode in which said image data are read from said memory in a second predetermined order to start forming said image from said image data when a predetermined number of pages of said image data are stored in said memory; and
- wherein said timing controller sets a timing of switching said printing resolution so as to switch said printing resolution when said image formation from said image data is started.

8. An image forming apparatus according to claim 7, wherein:
- said first predetermined order is obtained by rearranging a storing order of said image data into said memory according to a predetermined rule; and
- said second predetermined order is said storing order of said image data into said memory.

9. An image forming apparatus capable of image formation according to a print mode, wherein said image forming apparatus forms said image from image data obtained from a plurality of image data sources, wherein each of said plurality of image data sources has a different printing resolution, said image forming apparatus comprising:
- an image reader for reading said image data from an original;
- reception means for receiving said image data from an external device;
- a memory for storing said image data;
- a print waiting table;
- a registration controller for registering said image data stored in said memory as a print job in said print waiting table when said image data stored in said memory reaches a number of pages which is determined depending on said print mode;
- a printer for reading from said memory said image data contained in said print job registered in said print waiting table and for forming said image at said printing resolution determined depending on said image data source of said image data;
- a resolution switching controller for controlling switching of said printing resolution of said printer; and
- a timing controller for setting a timing of said switching of said printing resolution for said resolution switching controller depending on said print mode.

10. An image forming apparatus according to claim 9, wherein said print mode includes:
- a first print mode in which said image data contained in said print job registered in said print waiting table are read in a predetermined order to start forming said image from said image data, and
- a second print mode in which said image data are read in an order for registration in said print job registered in said print waiting table to start forming an image from said image data;
- wherein said number of pages varies according to whether said print mode is said first print mode or said second print mode.

* * * * *